O. C. BJORNEBY & A. MIDGARDEN.
FRICTION DRIVE FOR MOTOR CYCLES.
APPLICATION FILED JULY 3, 1915.
1,185,616.
Patented June 6, 1916.
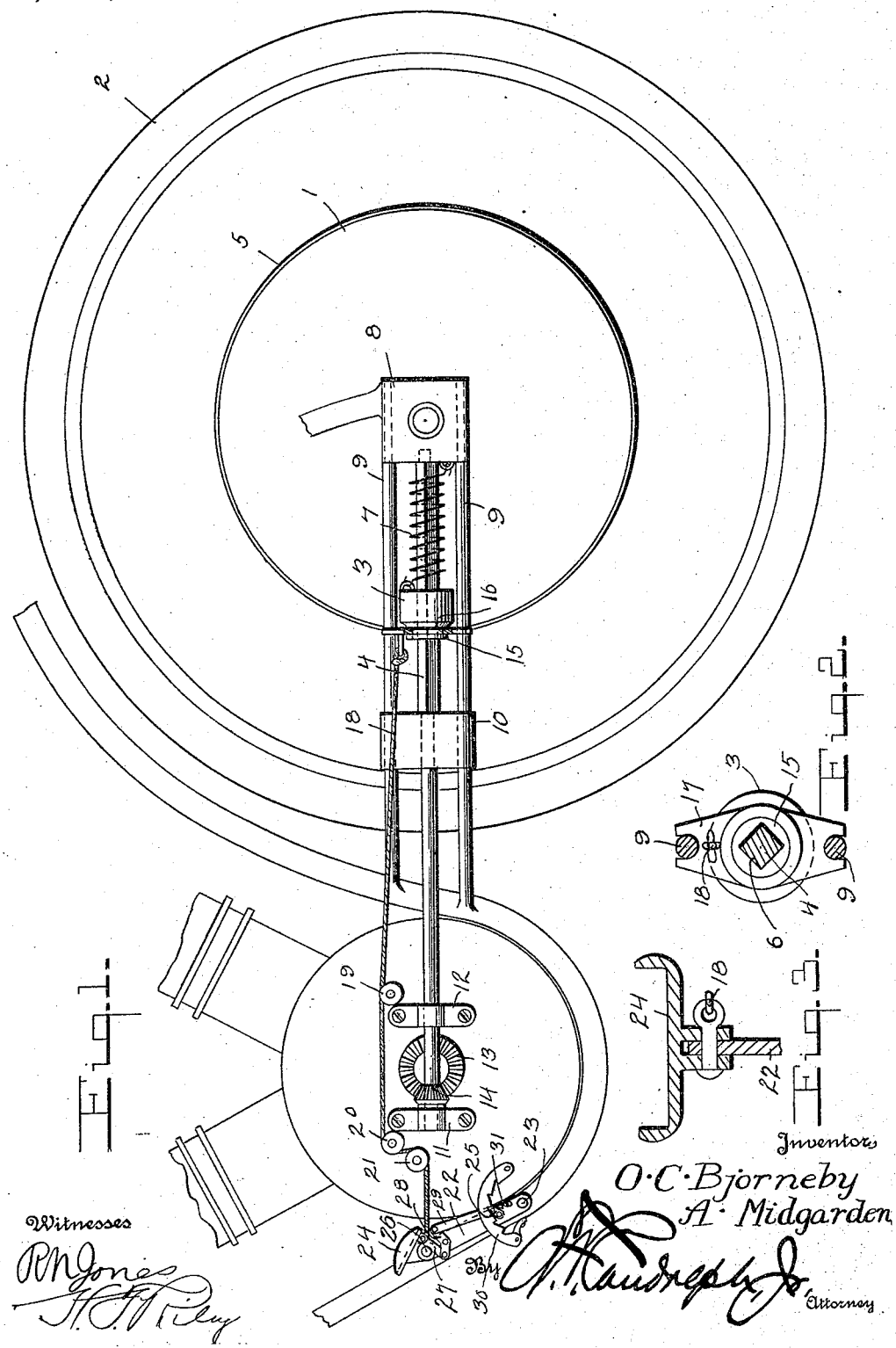
Witnesses
R. N. Jones
H. J. Riley
Inventors
O. C. Bjorneby
A. Midgarden
By
Attorney

UNITED STATES PATENT OFFICE.

OLIVER C. BJORNEBY AND AMUND MIDGARDEN, OF HOOPLE, NORTH DAKOTA.

FRICTION-DRIVE FOR MOTOR-CYCLES.

1,185,616. Specification of Letters Patent. Patented June 6, 1916.

Application filed July 3, 1915. Serial No. 38,004.

*To all whom it may concern:*

Be it known that we, OLIVER C. BJORNEBY and AMUND MIDGARDEN, citizens of the United States, residing at Hoople, in the county of Walsh and State of North Dakota, have invented certain new and useful Improvements in Friction-Drives for Motor-Cycles; and we do hereby declare the following to be a full, clear, and exact description of the invention, such as will enable others skilled in the art to which it appertains to make and use the same.

The invention relates to improvements in driving or transmission gearing for motor-cycles.

The object of the present invention is to improve the construction of mechanism for transmitting motion from a motorcycle engine to the drive wheel thereof and to provide a simple, practical and comparatively inexpensive friction drive adapted to be readily applied to motorcycles and capable of eliminating the troubles incident to chain and belt drives and of dispensing with the clutch necessary with such construction.

A further object of the invention is to provide a friction drive of this character adapted to be easily operated by the foot of the rider and capable of affording the desired power and of enabling the motorcycle to be run at an exceedingly high or exceedingly low speed without accelerating the engine or retarding the spark.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a side elevation of a portion of a motorcycle provided with a friction drive constructed in accordance with this invention. Fig. 2 is a detail sectional view illustrating the manner of connecting the rear end of the cable or flexible connection with the friction pinion, Fig. 3 is an enlarged detail view illustrating the manner of mounting the treadle.

Like numerals of reference designate corresponding parts in the several figures of the drawing.

In the accompanying drawing in which is illustrated the preferred embodiment of the invention, 1 designates a friction disk or wheel bolted or otherwise secured to the hub of the rear wheel 2 of a motorcycle and coacting with an adjustable friction pinion 3 mounted on a longitudinal shaft 4 and movable along the same toward and from the center of the friction disk or wheel 1 to vary the speed of the motorcycle.

The friction disk or wheel 1 is provided with a beveled periphery 5 to facilitate the movement of the friction pinion from the neutral position beyond the periphery of the friction disk or wheel to a position in engagement with the same. The friction pinion 3 which may be constructed of fiber or any other suitable material is mounted on a squared portion of the shaft 4 and it has a rectangular opening 6 to conform to the configuration of the same and it is automatically moved inwardly toward the center of the wheel to a high speed position by a coiled spring 7 disposed on the shaft 4 and connected at one end with the friction pinion and at the other end with a rear journal box 8 in which the rear end of the shaft is mounted. The coiled spring 7 is preferably a contractile spring and arranged in rear of the friction pinion 3 but it may be mounted in any other desired manner for automatically urging the friction pinion rearwardly. Also, if desired the friction pinion may be urged in either direction against the action of a spring. The longitudinal shaft 4 is designed to be provided at its rear end with any suitable bearing and the journal box 8 is supported by spaced longitudinal bars or braces 9 of the motorcycle frame but any desired construction of motorcycle frame may be employed and the parts may be mounted thereon in any preferred manner as will be readily understood. The shaft 4 is supported at an intermediate point by a journal box 10 mounted on the longitudinal bars or braces 9 and the front portion of the shaft 4 is journaled in suitable bearings 11 and 12 located at opposite sides of a gear wheel 13 mounted on the engine shaft and meshing with a pinion 14 of the longitudinal shaft 4. The engine which is of the internal combustion type may be either a single cylinder or double cylinder of any preferred construction and as the engine does not constitute a portion of the present invention and furthermore as any desired engine may be employed further explanation thereof is deemed unnecessary.

The longitudinal shaft 4 is shown continuous but where the motorcycle frame is provided with hinged joint the shaft may be constructed in section connected by a universal joint. The friction pinion is provided at the front with an extension 15 having a groove 16 and connected with a slidable member 17 preferably guided by the braces 9 and connected to the rear end of a cable 18 or other suitable flexible connection. The cable 18 extends forwardly over guide pulleys 19 and 20 and under a guide pulley 21 and its front end is attached to an operating device consisting of a lever 22 fulcrumed at its lower end 23 by a suitable pivot and provided at its upper end with a pivotally mounted pedal 24 adapted to be operated by the foot of the rider for disengaging a pawl 25.

The pedal 24 which is pivoted at 26 to the upper end of the lever 22 is connected by a link 27 with one arm of a bell crank lever 28 which has its other arm connected by a link or rod 29 with the pawl or dog 25. The pawl or dog 25 engages a suitable ratchet bar 30 provided at its under side with teeth and the said pawl or dog 25 which is preferably maintained in engagement with the teeth of the ratchet bar by a spring 31 is adapted to be moved downwardly out of engagement with the ratchet bar by depressing the upper portion of the foot plate or treadle 24. When the pawl or dog is moved downwardly out of engagement with the ratchet bar the contractile spring 7 automatically carries the friction pinion rearwardly toward a high speed position and when the spring automatically effects the desired adjustment of the friction gearing the friction pinion is locked in such adjustment by releasing the foot control, ratchet pawl or dog and permitting the same to reëngage the ratchet bar 30.

In practice, the friction pinion, the gearing and the means for connecting the operating device with the friction pinion will be arranged within a suitable casing to protect the parts from dust and dirt and also to prevent the operator from coming in contact with the same.

What is claimed is:—

1. The combination with a motor cycle, of a friction disk or wheel connected with the drive wheel of the motor cycle, a longitudinal shaft journaled on the frame of the motor cycle at one side thereof, a friction pinion slidably interlocked with the shaft and movable along the same to engage the friction disk or wheel at different points, guiding means located above and below the said shaft, a member slidable along the guiding means and connected with the pinion, a spring for urging the pinion in one direction and operating mechanism connected with the slidable member for moving the pinion in the opposite direction.

2. The combination with a motorcycle, of a friction disk or wheel connected with the rear wheel of the motorcycle, a longitudinal shaft mounted on the motorcycle, a friction pinion slidably interlocked with the shaft and meshing with the friction disk or wheel, a spring disposed on the shaft and arranged for urging the friction pinion in one direction and operating mechanism connected with the friction pinion for moving the same in the opposite direction.

3. The combination with a motorcycle, of a friction disk or wheel connected with the rear wheel of the motorcycle, a longitudinal shaft mounted on the motorcycle, a friction pinion slidably interlocked with the shaft and meshing with the friction disk or wheel, a contractile spring disposed on the rear portion of the shaft and connected with the friction pinion for moving the same rearwardly, and operating mechanism connected with the friction pinion for moving the same forwardly against the action of the said spring.

4. The combination with a motorcycle, of a friction disk or wheel connected with the rear wheel of the motorcycle, a longitudinal shaft, a friction pinion slidably interlocked with the shaft and movable along the same to different positions with respect to the friction disk or wheel, a spring for urging the friction pinion rearwardly, an operating lever, a flexible connection extending from the operating lever to the friction pinion and a latch carried by the operating lever for locking the same in its adjustment.

5. The combination with a motorcycle, of a friction disk or wheel connected with the rear wheel of the motorcycle, a longitudinal shaft journaled in suitable bearings of the motorcycle, a friction pinion slidably interlocked with the longitudinal shaft and movable along the same to engage the friction disk or wheel at different points, a spring for urging the pinion in one direction, an operating lever connected with the friction pinion for moving the same in the opposite direction, a ratchet bar, a pawl or dog carried by the operating lever and arranged to engage the ratchet bar, a foot plate or treadle and means for connecting the foot plate or treadle with the pawl or dog.

6. The combination with a motorcycle, of a friction disk or wheel connected with the rear wheel of the motorcycle, a longitudinal shaft journaled in suitable bearings of the motorcycle, a friction pinion slidably interlocked with the longitudinal shaft and movable along the same to engage the friction disk or wheel at different points, a spring for urging the pinion in one direction, an operating lever connected with the friction pinion for moving the same in the opposite direction, a ratchet bar provided at the bottom with teeth, a pawl or dog carried by the operating lever and arranged to engage the ratchet teeth, a foot plate or treadle pivotally mounted on the operating lever and a bell crank also carried by the operating lever connected with the foot plate or treadle and with the pawl or dog.

7. The combination with a motorcycle, of a friction disk or wheel connected with the drive wheel of the motorcycle and provided with a beveled edge, a shaft mounted on the motorcycle and arranged radially with respect to the friction disk or wheel, a pinion slidably mounted on the said shaft and movable along the same to different points on the friction disk or wheel and adapted to be carried beyond the same over the said beveled edge and means for operating the friction pinion.

In testimony whereof we affix our signatures in presence of two witnesses.

OLIVER C. BJORNEBY.
AMUND MIDGARDEN.

Witnesses:
R. H. RINDE,
N. V. OLSON.

Copies of this patent may be obtained for five cents each, by addressing the "Commissioner of Patents, Washington, D. C."